United States Patent Office 3,427,820
Patented Feb. 18, 1969

3,427,820
CRYOGENIC FLASH FREEZING MACHINES
James Hart, Tucson, Ariz., assignor to Reliquifier Corporation of America, New York, N.Y., a corporation of New York
Continuation-in-part of application Ser. No. 437,414, Mar. 5, 1965. This application Nov. 14, 1966, Ser. No. 594,144
U.S. Cl. 62—307
Int. Cl. F25d 3/10, 17/02, 25/04
6 Claims

ABSTRACT OF THE DISCLOSURE

A flash freezing machine constituted by an open-ended tunnel having a foraminous conveyor therein to transpose food from the open inlet to the open outlet, the food being sprayed by a cryogenic liquid in a freezing zone within the tunnel, cold gas evolving from the sprayed food being directed in cyclonic flow paths which pass through the conveyor in the freezing zone.

---

This invention relates generally to apparatus for freezing perishables by means of liquid cryogenic agents, such as liquid nitrogen or liquid air, and more particularly to machines adapted to freeze perishables effectively and with a high degree of rapidity to minimize the loss of moisture and volatile oils therefrom. This application is a continuation-in-part of my copending application Ser. No. 437,414, filed Mar. 5, 1965, entitled "Cryogenic Freezing Unit."

The preservation of food by quick freezing is a major development of this century, for it has marked advantages over cold storage techniques and makes it possible to maintain highly perishable food, such as fish, in a satisfactory condition for prolonged periods. In quick freezing, the zone of maximum crystal formation is obtained in thirty minutes or less, such speed insuring the production of every small ice crystals and a minimum disturbance or damage to the tissue structure of the food.

While various methods are currently used in quick freezing, they may be broadly divided into three classes. In the first or direct freezing method, food is quick frozen by the immersion or direct contact of the food with a freezing medium. In the indirect method, the food is placed between plates or in a container which is refrigerated. In the convection method, the food is frozen by exposure to a blast of cold air.

All of these known methods are subject to many practical disadvantages including inefficiency and high cost, as well as the excessive amount of time required to freeze the product satisfactorily, particularly if large food pieces are involved. Moreover, when food is frozen in an exposed state, a substantial loss of moisture is encountered which reduces the sellable weight of the food.

In my above-identified copending application, there is disclosed a cryogenic freezing unit wherein food is progressively pre-cooled as it is conveyed through an elongated, open-ended tunnel toward a freezing-zone where the food is exposed to atomized liquid nitrogen. Pre-cooling of the food is effected by cold gas evolved in the freezing zone, the cold gas being drawn into and rendered turbulent in the pre-cooling zone in advance of the freezing zone.

In my earlier cryogenic freezing unit, rapid freezing is effected by the combined action of the latent heat of vaporization of the liquid nitrogen and the specific heat of the cold gas evolved from the liquid. The heat energy necessary to transform the state of the liquid nitrogen into gas in the freezing zone is derived from the food exposed to atomized nitrogen in this zone, whereas in the pre-cooling zone, the heat energy or B.t.u.'s which raises the temperature of the cold gas is absorbed from the advancing food which travels in heat exchange relationship with the cold gas.

A machine of the type disclosed in my copending application produces very rapid freezing of food and realizes the primary advantages of quick freezing without many of the drawbacks incident to other freezing techniques. Nevertheless, for some purposes this freezing action may not be sufficiently rapid. When food is in heat exchange relationship with a turbulent cold gas, the resultant reduction in the temperature of the food is not entirely due to the specific heat of the gas, for evaporative freezing also takes place. That is to say, the turbulent gas passing over the food promotes evaporation of the volatile oils and the water of composition. While such evaporation extracts heat from the food, it also results in the depletion of the oils and water. Hence when the food is subsequently thawed for use, it lacks the natural moisture and the oil constituents which are vital to the flavor and taste of the food, and the resultant product is somewhat dessicated and of poor quality. Moreover, the losses produced in freezing reduce the saleable weight of the product as much as 10%.

Accordingly, it is the main object of this invention to provide a machine for the quick freezing of food which is exceptionally efficient in operation and which effects flash freezing by the use of the latent heat of vaporization of liquid nitrogen or liquid air, as well as the specific heat of the extremely cold gas evolved therefrom, while minimizing food evaporation.

A significant feature of the invention is that food frozen by the machine has virtually all of its food and weight values preserved, so that when later thawed the food is not only fit to eat but its quality closely approaches that of the food in its original and fresh state.

More specifically it is an object of the invention to provide a machine wherein food is advanced from the inlet to the outlet of an open-ended thermally insulated tunnel, the food being sprayed therein with a volatile cryogenic liquid, the resultant cold gas being rendered turbulent and being cyclonically circulated in heat exchange relationship with the food to promote quick freezing thereof, the cold gas being conducted adjacent cooling coils within which the cryogenic liquid flows, the coils acting to reduce the temperature of the gas whereby flash freezing occurs which minimizes evaporative freezing effects.

Also an object of the invention is to provide a machine of the above type which is of compact design and yet has a high capacity for efficiently flash-freezing large quantities of food in a relatively short period.

Yet another object of the invention is to provide a chiller tank making use of the liquid cryogenic agent for cooling relatively warm perishables before they are introduced into the freezing machine.

Still another object of the invention is to provide a cryogenic liquid spray system for a freezing machine wherein gas blockages in the flow lines are eliminated to produce a constant pressurized liquid feed.

A further object of the invention is to provide a freeze-down machine using liquid air wherein the liquid is volatilized without producing an excessive and hazardous amount of oxygen within the tnunel.

Briefly stated, these objects are attained in a flash-freezing machine including an elongated open-ended, thermally insulated tunnel having a foraminous conveyor therein for transporting food from the inlet to the outlet of the tunnel. Disposed within the tunuel above the conveyor in a freezing zone therein is a set of jet nozzles adapted to spray a cryogenic liquid onto the food advancing therebelow. Cold gas evolving from the sprayed food is drawn from the freezing zone and is forced downstream in countercurrent relationship to the advancing food toward the inlet, the cold gas at the same time being directed in cyclonic flow paths which pass through the foraminous conveyor in the freezing zone and intersect the downstream path of the gas to create regions of turbulence which promote heat exchange with the food passing therethrough.

Cooling coils may be provided in the stream paths of the cold gas, cyrogenic liquid flowing within these coils whereby the temperature of the cold gas is reduced to an ultra-cold level which gives rise to an extremely rapid reduction in temperature to crystallize the water of composition and to solidify the voltaile oils of the food before evaporation can take place. Thus optimum use is made of the available cryogenic liquid, and flash freezing is effected in a relatively small space and at comparatively low cost.

While the invention will be described using liquid air or nitrogen as the cryogenic liquid, it is to be understood that any cold boiling liquid may be used, i.e., one having a boiling point well below 0° F., such as oxygen and argon.

For a better understanding of the invention, as well as other objects and further features thereof, reference is made to the following detailed description to be read in conjunction with the accompanying drawing wherein.

Introduction

Food is not a good heat conductor; hence when a cryogenic liquid agent, such as liquid air or liquid nitrogen impinges on the surface thereof, the interior temperature does not immediately fall to that of the exterior. If therefore only a portion of the food surface is subjected to the liquid agent, the exterior will tend to shrink unevenly while the interior remains relatively warm, with a resultant cracking of the shrunken outer crust. Moreover, when extremely cold liquid impinges on the surface of the food, it has a tendency to pierce or penetrate the food.

As distinguished from relatively slow-quick freezing techniques, flash freezing in accordance with the invention acts not only to insure the production of very small nondescructive ice crystals within the food, but also to subject the entire body of the food, rather than a portion thereof to intense freezing temperatures which in short order act to solidify the interior as well as the exterior of the food body and to entrap all of its liquid constituents before evaporative effects take place. Thus the purpose of flash-freezing is to quick freeze the foodstuff in a manner which not only serves to lock in the flavor and retain all of the natural constituents of the food, but which will also preserve the physical form and weight of the food.

Structure of the flash-freezing machine (Model I)

Figure 1:
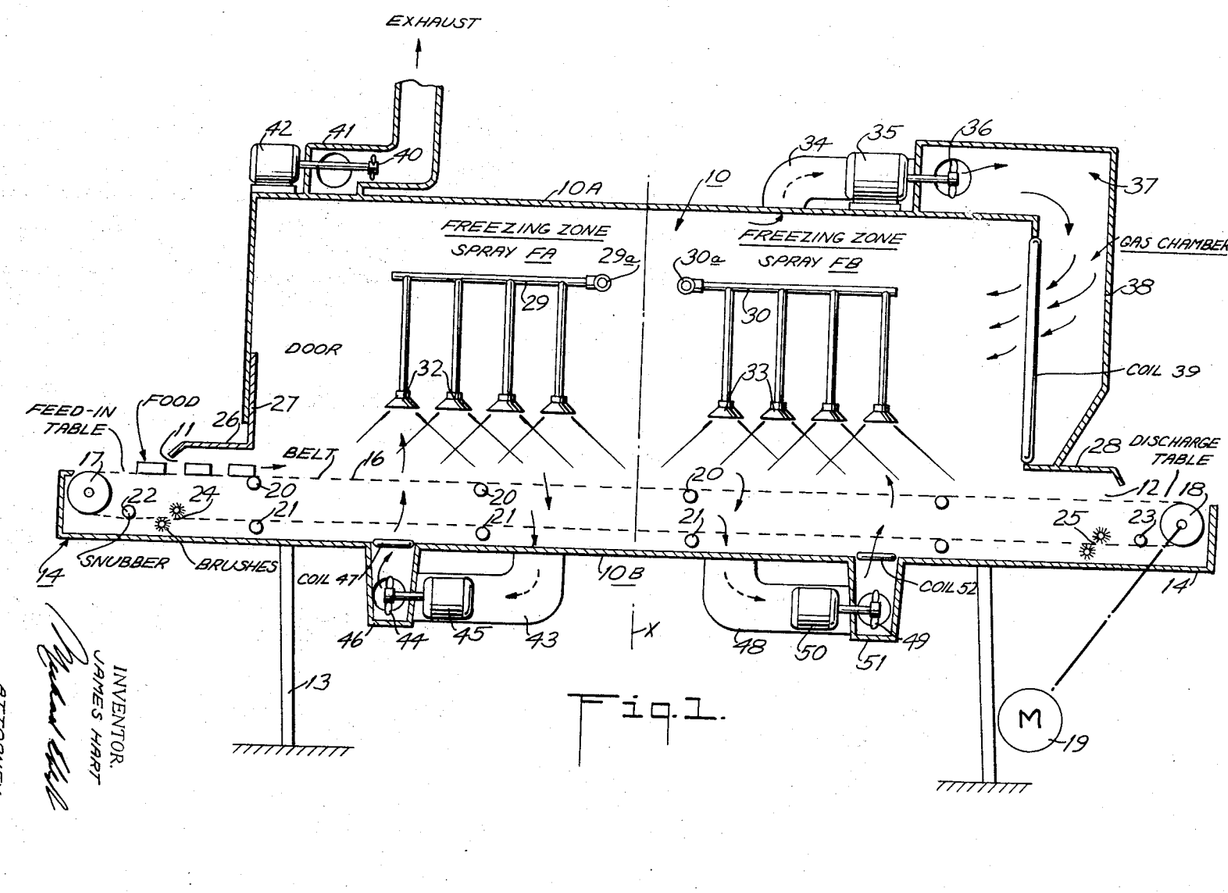
FIG. 1 is a schematic diagram of one preferred embodiment of a flash-freezing machine in accordance with the invention, the diagram being in the form of a longitudinal section taken through the machine.
Figures 2, 3:
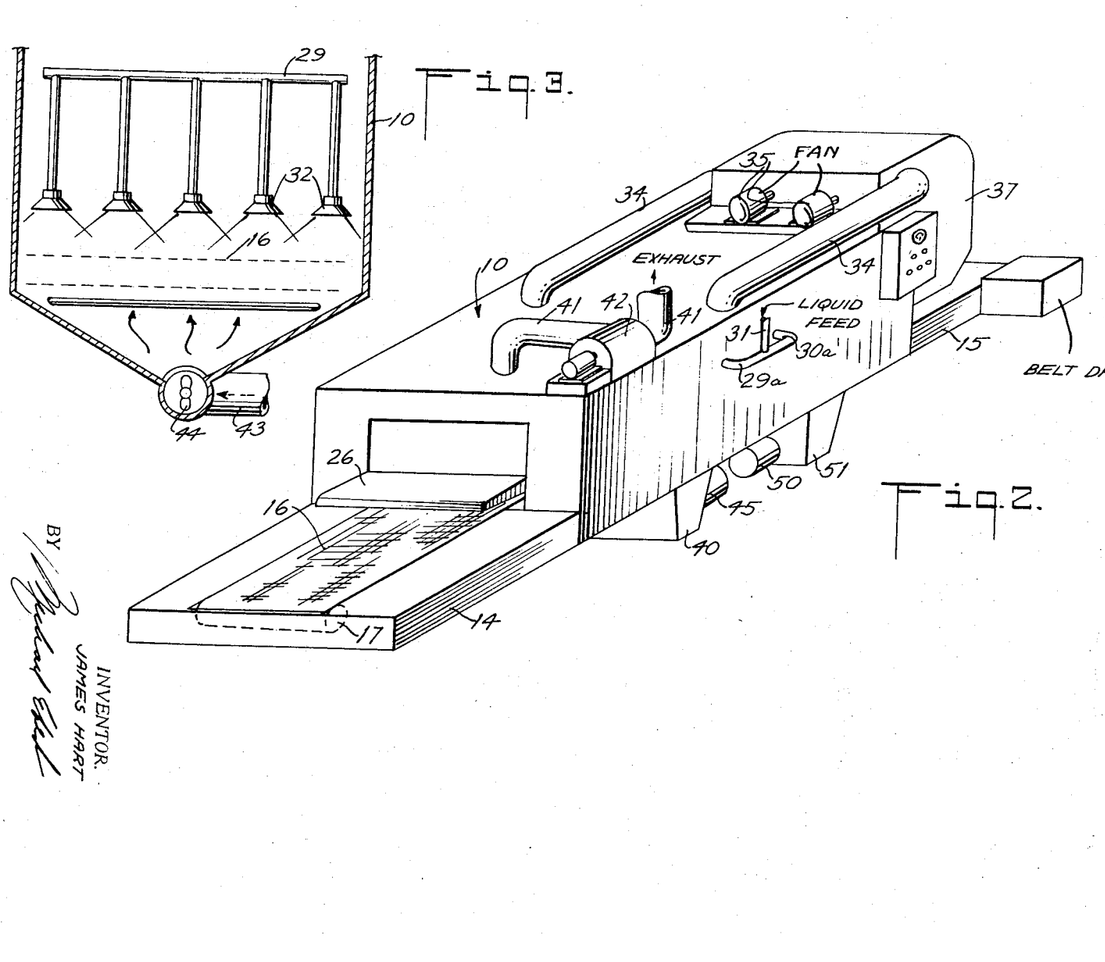
FIG. 2 shows the same machine in perspective view.
FIG. 3 is a transverse section taken through one of the freezing zones in the flash-freezing machine.

Referring now to the drawings and more particularly to FIGS. 1, 2 and 3, one embodiment of a flash-freezing machine in accordance with my invention comprsies an elongated and thermally-insulated tunnel structure 10 having an open inlet 11 and an open outlet 12, the tunnel having a rectangular cross section. The tunnel is supported in the horizontal plane above ground on suitable posts or standards 13. The base portion of the tunnel has front and rear extensions projecting beyond the inlet and outlet, respectively, and forming a feed-in table 14 and a discharge table 15.

Food or other perishables or products to be frozen, such as drugs and other forms of organic material, is conveyed from the inlet to the outlet of the tunnel by means of a continuous conveyor belt 16 which is looped between two main rollers 17 and 18, the unfrozen food being deposited on the belt on the feed-in table, and being later picked up in the frozen state from the discharge table. Main roller 17 is rotatably supported between suitable bearings within feed-in table 14, while main roller 18 is similarly supported within discharge table 15. Roller 18 is operatively coupled by belts or sprocket chains to a drive motor 19 disposed below the tunnel and provided with suitable variable speed control means to adjust the speed of belt movement.

The endless belt 16 has an upper level whose position is maintained by a series of spaced idler rollers 20, the belt having a parallel lower level whose position is maintained by idler rollers 21. Snubber rollers 22 and 23 are provided adjacent the main rollers to keep the belt under tension and to prevent sagging thereof, while adjacent these are rotary brush sets 24 and 25 which act to remove frost and any foreign matter clinging to the belt. To maintain the food-carrying upper deck of the belt perfectly level, nylon strips may be disposed between the idler rollers 20.

Belt 16, which is foraminated or of the mesh, woven or link-chain type, may, for example, be formed of woven stainless steel. It is essential that the belt be permeable to the cryogenic gas, for as will be disclosed later in greater detail, in the freezing process, cold gas is projected through the belt to make contact with the food thereabove. The carrier or idler rolls are preferably formed of stainless steel pipes whose ends are provided with spring-loaded bearing plugs whereby these rolls may readily be removed for cleaning or repair. A Teflon coating on the belt may be desirable, for it prevents food from sticking thereto.

While the inlet 11 is open to the atmosphere and gas locks are not used, it is desirable that this opening be no larger than is necessary to admit the food being processed to prevent the loss of cold gas. To this end, the inlet is provided with a canopy 26 which extends over the feed-in table 14. Also provided is an adjustable door 27 which may be lowered to partially close the inlet to about the level of the food being carried on the conveyor belt. The outlet is similarly provided with a canopy 28 which extends over the discharge table.

Mounted with the tunnel 10, above the upper level of conveyor belt 16, are two spray manifolds 29 and 30, manifold 29 being positioned adjacent the inlet side of the centerline X of the tunnel, with manifold 30 positioned adjacent the outlet side thereof. A cryogenic liquid, such as liquid nitrogen at −320° F. or liquid air at −312° F., is fed into both manifolds through input pipes 29a and 30a which are joined to a liquid feed line 31 (FIG. 2) leading to a supply tank.

Manifold 29 is coupled to an array of jet nozzles 32, while manifold 30 is coupled to an array of jet nozzles 33, all of which are spaced from each other in the longitudinal direction. Thus as food is advanced on the belt 16 therebelow, the food is sprayed by the cryogenic liquid agent. In practice, both manifolds may be connected to the supply tank through a flow regulator including a valve and a flow transmitter, the valve being automatically regulated to maintain a predetermined flow rate by means of a controller responsive to kow rate measurement derived from the transmitter. This measurement is compared with a reference valve which varies as a function of tunnel temperature as sensed by a thermocouple preferably positioned adjacent the inlet to measure gas temperature at his point. For highest efficiency, the parameters of the system are adjusted so that substantially all of the liquid sprayed on the food is volatilized to form a cold gas.

The sections of the tunnel which incorporate the spray manifolds constitute freezing zones FA and FB. The cryogenic liquid is sprayed downwardly on the food in each zone, the nozzles 32 and 33 providing fine jet streams causing the liquid to atomize and form a fog or mist. The relatively warm food causes volatilization of the liquid and the resultant cold gas evolved in the freezing zones is drawn from the tunnel through a pair of ducts 34 which communicate with the tunnel adjacent the centerline X through the upper wall 10A thereof.

Gas is drawn from the tunnel by means of a pair of motors 35 which operate suction fans 36 disposed in each duct 34, the ducts leading to a gas chamber 37 attached to the outlet end of the tunnel. Cold gas sucked ino chamber 37 is deflected therein by a back wall 38, and is thereby directed through heat exchange coils 39 disposed at the rear of the tunnel structure. Cryogenic fluid is caused to flow within these coils, hence the cold gas passing between the coils is further reduced in temperature and is rendered ultra-cold.

The ultra-cold gas is admitted into the tunnel at the rear thereof, and by means of a suction fan 40 located in a duct 41 communicating with the upper wall 10A of the tunnel adjacent the inlet thereof and driven by a motor 42, the gas is drawn downstream in the tunnel in countercurrent relationship to the food advancing on belt 16. This gas, which is still cold, may be exhausted into the atmosphere through duct 41, or it may be used for cooling purposes elsewhere in the plant in which the machine is installed. Alternatively, it may be again liquified in a manner to be later described.

A portion of the cold gas evolved at freezing zone FA is drawn therefrom through a duct 43 communicating with the bottom wall 10B of the tunnel structure by means of a suction fan 44, operated by a motor 45 disposed outside the duct, the cold gas being readmitted to the tunnel through a return chamber 46, having a heat exchange coil 47 disposed therein to render the gas ultra-cold. As in the case of coil 39, cryogenic liquid also flows in coil 47.

Since the cold gas is drawn from the freezing zone FA and returned thereto in ultra-cold condition, the flow path of this gas is cyclonic, the underside of the food on the conveyor as well as the other exterior surfaces thereof being subjected to this gas which filters through the permeable conveyor belt. The downstream flow of gas from gas compartment 37 toward the inlet intercepts the cyclonic gas flow within the region of the freezing zone FA, and the resultant interaction produces a high degree of turbulence which promotes heat exchange with the food in this zone.

Similarly in freezing-zone FB, a cyclonic gas motion is produced by means of a duct 48 which communicates with the bottom wall 10B of the tunnel and conducts the gas drawn by suction fan 49, operated by motor 50, into a return chamber 51 having a heat exchange coil 52 therein. The downstream gas intercepts this cyclonic flow path to produce a high degree of turbulence.

Figure 4:
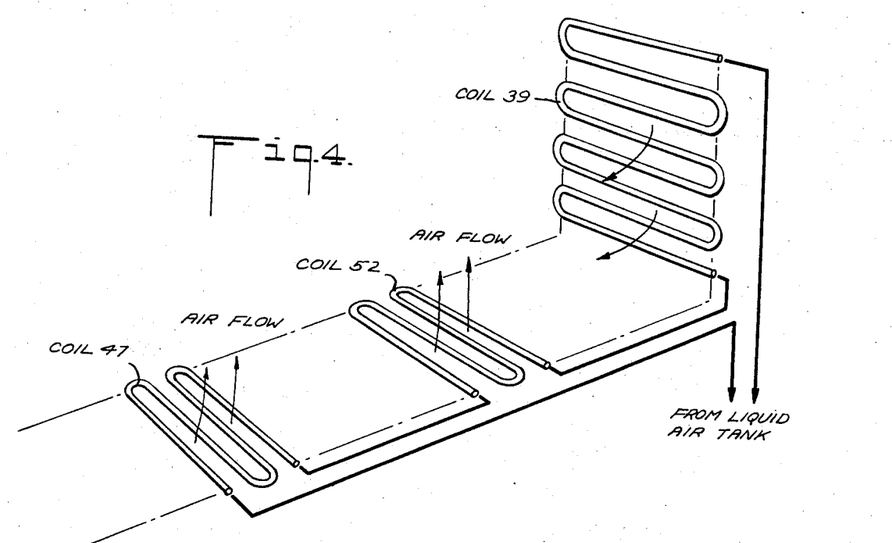
FIG. 4 separately shows the several arrangements of cooling coils in the machine.

The arrangement of heat exchange coils 39, 47 and 52 is shown separately in FIG. 4, and it will be seen that these coils are connected in series to a supply line leading to the liquid air tank. The liquid air may be produced by liquid air generators of the type currently manufactured by N. V. Philips of Holland, wherein contaminants such as moisture or carbon dioxide are separated from the ambient air input and a constant yield of liquid air is produced. In practice, the liquid air generator need not have the capacity to supply the freeze down machine on a continuous basis for liquid air may be generated and stored during the shut-down periods of the machine.

Operation of the machine (Model I)

In operation, food placed on the exposed portion of the conveyor belt on the feed-in table 14 enters inlet 11 of the tunnel and as it advances toward the first freezing zone FA, it is pre-cooled by the cold air circulating in the tunnel. This pre-cooling, which takes place for a period determined by the conveyor speed, acts to prevent an excessively abrupt change in food temperature and to condition the food for the next step. As the food passes under the series of nozzles 32 in food freezing zone FA, it is exposed to atomized liquid air and the heat energy necessary to volatilize the liquid is drawn from the food. At the same time, the food is subjected throughout its entire surface to ultra-cold air in a turbulent condition, whereby the internal temperature of the food is very sharply and very quickly reduced. This operation is repeated in the second freezing zone FB. In the remaining and final portion of the tunnel wherein the food is subjected only to ultra-cold air, the internal temperature of the food, which is well below the freezing point of water, is stabilized.

It is to be noted that a turbulent flow is produced by superimposing cyclonic or eddy currents on a uniform flow, and since the food advancing in the freezing zones lies in a turbulent region, rapid heat exchange is promoted, for the effective path of the gas with respect to the food is protracted. In other words, rather than a steady laminar gas stream of high velocity, the gas because of its turbulence tends to recirculate and eddy about the food and thereby afford an increased interaction therebetween.

Production of liquid air

While the invention is operable with any available form of cold boiling liquid, it must be borne in mind that the cost of operation is determined largely by the cost of cryogenic liquid. Because the machine operates with a high degree of efficiency, optimum use is made of the liquid. Nevertheless it is desirable to reduce the cost of the liquid to the lowest possible value if widespread commerical use is to be enjoyed.

Figure 5:
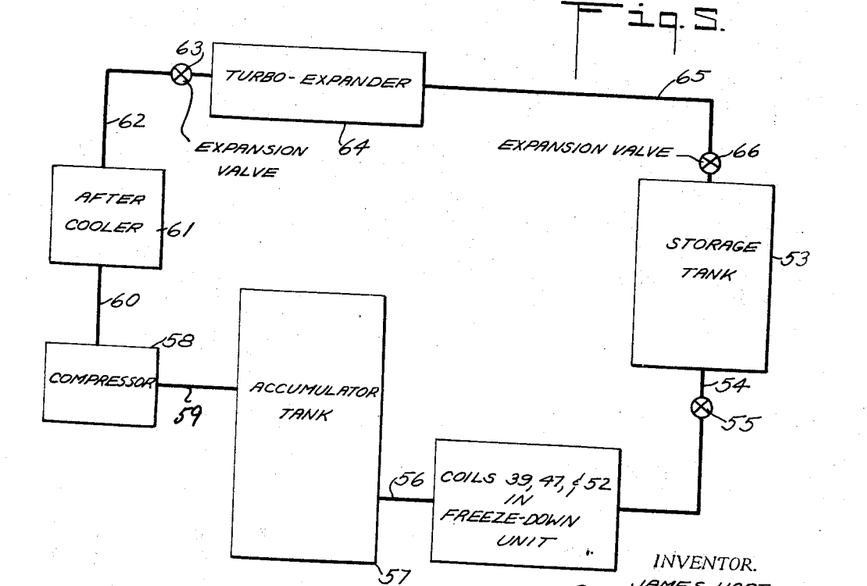
FIG. 5 is a block diagram of a preferred system for producing a cryogenic liquid for supplying the machine.

Accordingly, as shown in FIG. 5, a cold boiling substance in liquid phase is passed from a relatively low pressure container through a closed conduit in heat exchange relationship with the perishables so that the liquid is volatilized by the heat from the perishables, and the volatilized by the heat from the perishables, and the volatilized gas is reliquified by being compressed, cooled, expanded and returned to the container for re-use in the machine.

A storage tank 53 contains liquid nitrogen at a pressure of about 21 p.s.i.g. and a temperature of above −306° F. A duct connects the storage tank 53 to the heat exchange coils 39, 47 and 52 of the freezing unit. A valve 55 in duct 54 controls the flow of liquid nitrogen from the storage tank 53 to the freezing unit.

Inside the freezing unit the nitrogen passes through a series of heat exchange coils (coils 39, 47 and 52) in heat exchange relationship with cold gas evolved from the liquid sprayed on the perishables to be frozen. Heat extracted from the cold gas to render it ultra-cold causes the nitrogen to volatilize.

The volatized nitrogen then passes through duct 56 into accumulator tank 57 at a temperature of about 0° F. and a pressure of about 21 p.s.i.g. The temperature of the volatilized nitrogen entering the accumulator tank is controlled by the volume of liquid nitrogen fed into the freezing unit. A compressor 58 picks up volatilized nitrogen from tank 57 through duct 59, the gas being compressed to about 125 p.s.i.g. The compressed gas then passes through duct 60 to after-cooler 61 where it is cooled to about 0° F. at 125 p.s.i.g.

The cooled gas then passes through duct 62, Joule-Thompson valve 63, turbo-expander 64, duct 65 and Joule-Thompson valve 66 into storage tank 53. The nitrogen expanding from about 125 p.s.i.g. and 0° F. to about 21 p.s.i.g. through the expansion valves 63 and 66 and the turbo-expander 64 is converted to liquid at a temperature of about −306° F. and can be re-used in the operation.

*Structure and operation of flash-freezing machine (Model II)*

Figures 6, 7:
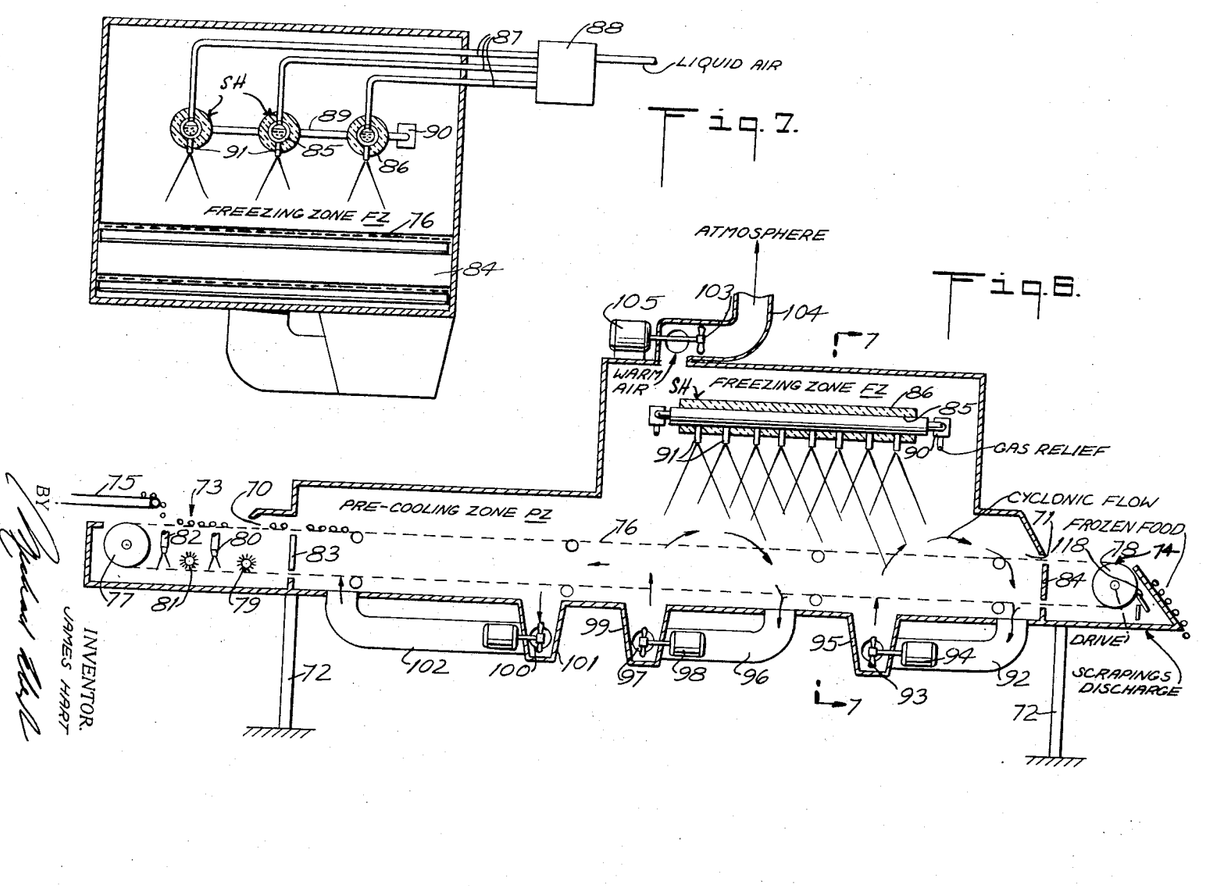
FIG. 6 is a schematic diagram of another preferred embodiment of a freezing machine, shown in longitudinal section.
FIG. 7 is a transverse section of the machine taken in the plane indicated by lines 7—7 in FIG. 6.

Referring now to FIG. 6, another embodiment of a machine is shown wherein the elongated and thermally-insulated tunnel structure includes a pre-cool zone PZ, which communicates with a freezing zone FZ, the pre-cool zone having an open inlet 70, and the freezing zone having an open outlet 71. The tunnel has a rectangular cross-section, the height of the tunnel being relatively small in the pre-cool zone and much larger in the freezing zone, to allow room for the spray headers and for the formation of a warm-air layer whose function will be later explained.

The tunnel is suppported in the horizontal plane by suitable standards 72. The base portion of the tunnel has front and rear extensions projecting beyond the inlet and outlet respectively, and forming a feed-in table 73 and a discharge table 74. In practice, the upper sections of the pre-cool and freezing zones of the tunnel are separable from the lower sections thereof to permit cleaning or repair of the interior.

While the machine is usable with a variety of perishables, by way of illustration I shall describe its freezing operation with shrimp, which has been peeled and deveined. The shrimp, which has been chilled in a chiller tank to be later described, is fed into the machine by means of a conveyor 75 which moves within the tank and deposits the shrimp onto the feed-in table 73, which is defined by the exposed portion of a continuous conveyor belt 76 looped within the tunnel between main rollers 77 and 78. Main roller 77 is rotatably supported on suitable bearings within the feed-in table 73 at the end thereof, whereas main roller 78 is similarly supported within discharge table 74. Roller 78 is operatively coupled by belts or sprocket chains to a suitable drive motor (not shown).

Endless belt 76, which is foraminated and is similar to that shown in FIG. 1, is supported at its upper and lower decks by spaced idler rollers, very much in the manner of belt 18 in FIG. 1. To remove frost and any foreign matter clinging to the belt, there is provided in conjunction with the lower deck at its feed-in table, stainless steel brushes 79 whose coarse flexible bristles are capable of entering the interstices of the belt to remove frost and particles therefrom. This is followed by a bank of water jets 80 which then spray the belt with relatively warm water to clean same, this in turn being followed by nylon brushes 81 to provide a fine-cleaning action, after which the belt is subjected to a stream of pressurized air from jets 82 to dry the belt before it is again loaded with food and enters the pre-cool zone PZ.

A scraping blade 118 is provided whose edge is contiguous to the belt adjacent the roller 78 to scrape off ice and food particles clinging to the belt. Brushes may also be arranged to engage the lower deck of the belt at the discharge table to clean the belt. Also, a stainless steel wire (not shown) may be stretched across the belt within the freezing zone just above the upper deck of the belt to dislodge food frozen to the belt. In practice, heating coils may be provided in the feed-in table to prevent ice from forming on the belt. Alternatively, the belt may be vibrated to break up ice thereon.

While both the inlet and outlet are open to the atmosphere, it is desirable that these tunnel openings be no larger than is necessary to admit the food being processed. Hence these openings above the upper deck of the belt are just above the level of the food passing therethrough. A transverse baffle 83 is provided between the upper and lower decks of the belt at the inlt 70 to minimize exposure and a similar baffle 84 is provided at the outlet to limit the leakage of cold air from the tunnel and the admission of warm air thereto.

Mounted within the freezing zone FZ are spray headers SH to spray food advancing therein with a cryogenic liquid agent such as liquid air. As best seen in FIG. 7, each header SH is constituted by a relatively large pipe 85, such as aluminum tubing, having a three-inch internal diameter, the pipe being surrounded by suitable thermal insulation 86. Two inches of rigid polyurethane foam is a suitable thermal insulation for this purpose.

A series of nozzles 91 are coupled through the insulation at spaced longitudinal portions to the pipe 85 to spray liquid air onto the food passing therebelow on the belt. In the arrangement shown, three pipes are provided to produce a relatively uniform spray across the tunnel. Each of the pipes is supplied with liquid air by relatively small lines 87 having, for example, an internal diameter of one-half inch, these lines going to a manifold 88 which in turn is coupled to a source of liquid air.

At either end of the three large pipes 85 there is provided a gas bleed-off in the form of a transverse stub line 89 communicating with each of the pipes and terminating in an electromagnetically-actuated relief valve 90.

The problem ordinarily encountered in spray headers for liquid cryogenic agents is the formation of gas resulting from liquid volatilization within the line by reason of internal flow friction or external heat. Such gas acts to block the flow of liquid, as a consequence of which the liquid flow is intermittent, for even when a gas pocket is forced out of the pipe by liquid pressure, new gas pockets are formed therein, with a resultant spurting or pulsing action rather than steady liquid flow.

Conventionally, it has been the practice to use small pipes to increase liquid velocity and thereby minimize gas formation, but this has not been successful, particularly if the ambient temperature is well above the liquid temperature, as may happen in the upper reaches of the tunnel. To feed the liquid from a small-diameter line to a relatively large-diameter pipe in the manner of the present invention is therefore contrary to the usual practice, for this would appear to provide an expansion space within the pipe promoting the formation of gas.

In the present invention, the liquid is deliberately fed into a larger pipe from a smaller line in order to produce an annular blanket of gas surrounding the liquid to create an inwardly directed gas pressure which promotes liquid expulsion from the pipe through the nozzles. In order to prevent gas-blocking of the pipes, at the beginning of the operation the electromagnetically-actuated relief valves 90 are opened to discharge cold air in the freezing zone until such time as liquid appears, thereby indicating a condition of gas clearance. At this point the valves are closed and thereafter a liquid under a constant gas pressure is ejected at a uniform rate from the nozzles, without gaseous interruptions. Maintenance of the flow rate as a function of internal tunnel temperature may be effected in the manner described in connction with FIG. 1. The liquid pressures in the spray headers are self-equalizing for the gas pressures therein produce a back pressure in the three pipes which tends to balance the gas pressures on the the liquids therein.

The cryogenic liquid is sprayed downwardly on the shrimp or other food in freezing zone FZ, the nozzles 91 providing fine jet streams causing the liquid to atomize and to form a fog or mist. The relatively warm food causes volatilization of the liquid, and the resultant cold gas evolved in the freezing zone is drawn therefrom at three positions, one adjacent the input to this zone, the other adjacent the output, and the third, at an intermediate position.

A portion of the gas evolved in freezing zone FZ is drawn therefrom through a duct 92 communicating with the bottom wall of the tunnel adjacent the output of the freezing zone, which is also the outlet of the tunnel structure, by means of a suction fan 93 operated by a motor 94, the cold gas being readmitted to the tunnel through a return chamber 95. This action produces in the output region of the tunnel a cyclonic action whose flow path, as indicated by arrows, passes through the permeable belt and encircles the food thereon.

Another portion of the gas evolved in the freezing zone is drawn therefrom through a duct 96 communicating with the bottom wall of the tunnel adjacent the midsection of the freezing zone by means of a suction fan 97 operated by motor 98. This cold gas is readmitted to the tunnel through a return chamber 99 to produce a cyclonic flow action in the region adjacent the input to the freezing zone.

The cold gas produced in the freezing zone is drawn downstream in the direction of the pre-cool zone by means of a fan 100 in a chamber 101 coupled to the bottom wall adjacent the input to the freezing zone, and this gas is returned to the tunnel through duct 102 communicating with the tunnel adjacent the front end of the pre-cool zone, thereby providing a cyclonic flow within the pre-cool zone PZ.

It is to be noted that the flow of gas downstream produced by fan 100 which sucks in gas at the inlet of the tunnels interacts with the cyclonic gas motion created by fans 93 and 97 within the freezing zone to create a high degree of turbulence therein which promotes heat exchange within this zone. At the same time, the cyclonic motion within the pre-cool zone acts to reduce the temperature of the food before it enters the freezing zone to prevent an abrupt temperature transition in the course of food advance.

In the enlarged freezing zone FZ, the relatively warm air tends to rise above the layer of intensely cold air in the belt region. The expanding warm air effectively forms an air blanket which presses down on the cold layer therebelow to prevent dispersion thereof and to increase the efficiency of heat exchange. A fan 103 in a duct 104 communicating with the top wall of the freezing zone section of the tunnel and operated by motor 105, draws the warmer air from this zone and discharges it into the atmosphere. The action of this fan is adjusted to the rate at which air is generated within the tunnel so that warm air is discharged at a rate no faster than it is produced to maintain a state of balance in the freeze-down zone. This adjustment is made by a suitable damper (not shown) in duct 104 to regulate the exhaust.

In an actual embodiment of the machine, the width of the belt was thirty inches, the belt traveling at ten feet per minute. Because of the gas recirculation system employed, a temperature gradient is produced within the tunnel, the temperature becoming progressively lower from the input to the output. Thus the temperature range from the inlet of the pre-cooling zone to the input of the freezing zone runs between —100 to —200° F., while the temperature in the freezing zone from the input thereof to the midpoint runs between —200 to —250° F., and from the midpoint to the outlet of the tunnel from —250 to —300° F.

In this embodiment, an N.V. Philips type C liquid air generator is used to produce 600 pounds of liquid air per hour. Ambient air is fed into a compressor and then through an air dryer and carbon dioxide separator, the air being thereafter chilled down to —40 to —50° F. before being fed to the liquifier. The Philips liquifier unit functions on the Sterling cycle making use of hydraulically-operated opposed pistons for both compression and expansion of helium gas, the air being in heat exchange relationship therewith to produce liquid air at —317° F. While the freeze-down machine is capable of using 1000 pounds of liquid air per hour, whereas the Philips generator only produces 600 pounds during this period, a supply of liquid air is built up during the times the freeze-down machine is inactive. To this end, the liquid air is stored in an insulated tank or reservoir having a 35,000 pound cavity. It was found best to maintain liquid air in the tank at about 50 pounds pressure, which pressure was optimum for proper pressurized liquid feed to the machine. A lower pressure was found insufficient for constant liquid feed, while a higher pressure was found likely to produce leaks or ruptures in the lines.

*Chiller-tank*

Figure 8:
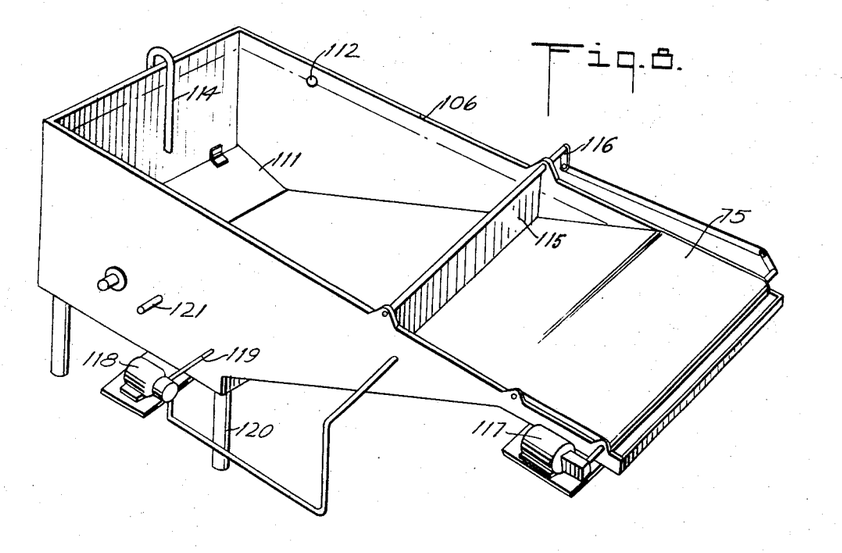
FIG. 8 is a perspective view of a chilling tank to cool the food before it is fed in the machine.
Figure 9:
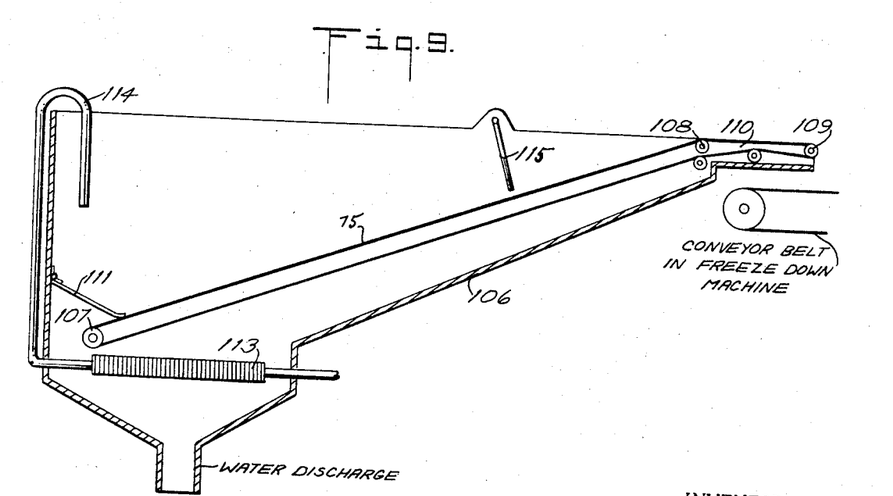
FIG. 9 is a section taken longitudinally through said tank.

Referring now to FIGS. 8 and 9, there is shown a chiller-tank for chilling shrimp before the shrimp is admitted into the tunnel structure. In the course of peeling or otherwise processing shrimp before freezing, the use of relatively warm water is ordinarily involved, as a consequence of which the cleaned shrimp is at a fairly warm temperature, even though it may have been iced before processing. It is desirable therefore, in order to operate the freeze-down machine at higher speed, that the shrimp fed therein be chilled to avoid the need to take the shrimp temperature down from too great a level.

To this end, the chiller-tank 106 is provided with a continuous belt 75 supported on rollers 107, 108, 109, and 110, the belt running along an inclined path from the bottom to the top of the tank, whereby shrimp dumped into the tank tends to fall into the V-shaped space defined by a hinged flat 111 whose edge engages the lower end of the belt.

The tank is filled with water, overflow above the maximum tank level being prevented by a discharge outlet 112 adjacent the rim of the tank. The water in the tank is chilled by means of liquid air preferably derived from the reservoir supplying the freeze-down machine and fed through coils 113 disposed at the bottom of the tank. The output of these coils is fed to a U-shaped bubbler pipe 114 which discharges cold gas into the water to both agitate and cool same.

A swinging paddle 115 is disposed within the tank to agitate the water therein and to bring about a fairly uniform distribution of the shrimp across the belt, the agitated water tending to level the shrimp on the belt and to prevent bunching thereof. The paddle is actuated by a crank 116 operated by a motor 117 which also drives the belt.

The water within the tank is circulated therein to bring about a uniform tank temperature by means of pump 118 which draws water from the bottom of the tank and through a pipe 119 conducts it to the top thereof. The tank is drained of contaminated water through a cleaning drain 120, fresh water being supplied to the tank through an intake 121.

In practice, belt 75 in the tank is operated at about half the speed of the main belt 76 in the freeze-down machine, so that when the chilled shrimp from the tank are deposited onto the main belt, the faster main belt acts to spread out the shrimp to facilitate freezing thereof. The length of belt travel in the tank and the speed thereof are made such as to reduce the temperature of the shrimp from approximately room temperature to about 40° F., this being a suitably low initial temperature for the freezing process.

It is important to bear in mind that when using liquid air, volatilization of this liquid first produces pure oxygen, then argon and finally nitrogen. The reason for this is that these gases have different boiling points, for oxygen becomes a gas at —297.4° F., whereas nitrogen does not become gaseous until —320° F. An oxygen build up in the machine obviously can be hazardous. To prevent this from happening, the spray rate is adjusted relative to the amount of food being frozen that substantially all of the liquid air is volatilized without any residual liquid at the bottom of the tunnel. But even if there is an excess of liquid, this will run into the duct members 95, 97 and 101 which have less insulation (1 inch) than the tunnel (4 inches) and are therefore warmer than the tunnel, the residual liquid being immediately volatilized in these fan chambers. To facilitate flow into the chambers, the tunnel may be slightly inclined from the horizontal.

The longer the tunnel, the more prolonged the freezing action. In same instances, where space is limited, it is necessary to work with a shorter tunnel, whose length is insufficient to effect a degrade freezing. The tunnel may be effectively lengthened by having two gas permeable conveyor belts, one running above the other in opposing directions, food being placed on the top belt and advancing to the end of the tunnel, and then dropping down onto the lower belt to be advanced in the reverse direction. In this case, the feed-in and the discharge are both at the tunnel inlet. Gas is recirculated through the bottom wall of the tunnel and passes through both belts.

For example, in some instances it is desirable to use a conveyor belt which is impervious to gas, such as a stainless steel or aluminum belt formed of thin, flexible sheeting. In this case, the width of the belt is made such as to leave a relatively wide space, say four inches, between the edges of the belt and the side walls of the tunnel to allow for gas passage therethrough and circulation.

Thus recirculating cold gas admitted through the bottom wall of the tunnel will flow around the side spaces and will also impinge on the belt to produce cyclonic effects within the tunnel. One advantage of a solid belt is that the liquid sprayed thereon will volatilize on the impervious surface thereof, rather than flowing through the pores in vacant positions between advancing food items, thereby increasing the efficiency of the system. One may also spray the liquid upwardly onto the belt, and thereby derive heat from the food carried thereon.

While there have been shown and described preferred embodiments of cryogenic flash-freezing machines in accordance with the invention, it will be appreciated that many changes and modifications may be made therein without, however, departing from the essential spirit of the invention as defined in the annexed claims.

What I claim is:
1. A flash-freezing machine comprising:
   (a) an elongated thermally-insulated tunnel structure having an open inlet and an open outlet, said structure having a pre-cool zone section communicating with the inlet and a freezing zone section communicating with the outlet, the freezing zone section having a height greater than that of the pre-cool zone section;
   (b) a foraminous moving belt to convey food adjacent the bottom of the structure from the inlet to the outlet thereof;
   (c) means above the belt in the freezing section to spray food advancing therein with a cold boiling liquid;
   (d) means to draw cold gas evolved in said freezing zone section from below the belt in said tunnel structure at a position adjacent the output thereof and to return it to said freezing zone section to produce a cyclonic stream therein passing through said belt and encompassing the food borne thereon; and
   (e) means to draw cold gas evolved in said freezing zone section from below the belt in said tunnel structure at a position adjacent the input to said freezing zone and to return it to said pre-cooling section to produce a cyclonic stream in said pre-cooling section encompassing the food borne thereon and at the same time acting to draw cold gas from said freezing section downstream to interact with the cyclonic stream therein to create a condition of turbulence; and
   (f) means communicating with the top wall of said freezing section to draw relatively warm air therefrom at a rate no greater than the rate at which it is produced.

2. A machine as set forth in claim 1, wherein said belt is supported by rollers at either end of the machine adjacent the inlet and outlet, and baffle means adjacent said rollers to minimize the loss of cold gas at said inlet and outlet.

3. A machine as set forth in claim 1, further including means to chill the food before it is placed on the belt at the inlet.

4. A machine as set forth in claim 3, wherein said chilling means is constituted by a water tank having an inclined moving belt therein to carry food from the bottom of the tank having a liquid cryogenic agent flowing to the top of the tank, and a coil at the bottom of the tank having a liquid cryogenic agent flowing therethrough which is discharged into the tank through a bubbler pipe.

5. A flash-freezing cryogenic liquid machine comprising:
   (a) an elongated, thermally insulated tunnel structure having an open inlet and an open outlet;
   (b) a foraminous moving belt to convey a product to be frozen adjacent the bottom of said tunnel structure from the inlet to the outlet thereof;
   (c) at least one freezing zone within said tunnel structure having means above said belt to spray food advancing thereon with a cold boiling liquid to cause substantially all of said liquid to volatilize and to form a cold gas.
   (d) duct means to draw cold gas evolved in said freezing zone from a first position below the belt in said tunnel structure and to return it to said tunnel at a second position below the belt displaced from the first position to produce a cyclonic stream looping through said belt and encompassing the product in said freezing zone to promote the uniform freezing thereof;
   (e) means to draw relatively warm air from said tunnel structure from a position above said belt at a rate not exceeding the rate at which it is generated therein, and
   (f) means to draw cold gas from said freezing zone and to direct it downstream in said structure in countercurrent relationship to said advancing food, said downstream flow intercepting said cyclonic stream to produce turbulenct in said freezing zone.

6. A flash-freezing cyrogenic liquid machine comprising:
   (a) an elongated, thermally insulated tunnel structure having an open inlet and an open outlet;
   (b) a foraminous moving belt to convey a product to be frozen adjacent the bottom of said tunnel structure from the inlet to the outlet thereof;
   (c) at least one freezing zone within said tunnel structure having means above said belt to spray food advancing thereon with a cold boiling liquid to cause substantially all of said liquid to volatilize and to form a cold gas, said means to spray food being constituted by a pipe having a relatively large internal diameter surrounded by thermal insulation and closed at both ends, nozzles disposed along said insulation and communicating at spaced positions with said pipe, a line having a smaller internal diameter coupled to said pipe to feed a cryogenic liquid thereto, whereby a portion of said liquid volatilizes within said pipe to produce a head of gas, and controllable gas-relief means coupled to the ends of said pipe to bleed off gas from said pipe;
   (d) duct means to draw cold gas evolved in said freezing zone from a first position below the belt in said tunnel structure and to return it to said tunnel at a second position below the belt displaced from the first position to produce a cyclonic stream looping through said belt and encompassing the product in said freezing zone to promote the uniform freezing thereof; and (e) means to draw relatively warm air from said tunnel structure from a position above said belt at a rate not exceeding the rate at which it is generated therein.

References Cited

UNITED STATES PATENTS

| | | | |
|---|---|---|---|
| 3,090,134 | 5/1963 | Morrison | 62—380 X |
| 3,345,828 | 10/1967 | Klee et al. | 62—64 X |
| 3,255,608 | 6/1966 | Macintosh | 62—374 |
| 3,277,657 | 10/1966 | Harper et al. | 62—63 |
| 3,287,932 | 11/1966 | Schlemmer | 62—374 |
| 3,298,188 | 1/1967 | Webster et al. | 62—63 |
| 3,315,480 | 4/1967 | Rich | 62—63 |

ROBERT A. O'LEARY, *Primary Examiner.*

WILLIAM E. WAYNER, *Assistant Examiner.*

U.S. Cl. X.R.

62—65, 374, 380

UNITED STATES PATENT OFFICE
CERTIFICATE OF CORRECTION

Patent No. 3,427,820                              February 18, 1969

James Hart

It is certified that error appears in the above identified patent and that said Letters Patent are hereby corrected as shown below:

Column 1, line 40, "every" should read -- very --. Column 2, line 63, "tnuuel" should read -- tunnel --; line 68, "tunuel" should read -- tunnel --. Column 3, line 60, "descructive" should read -- destructive --; line 74, "comprsies" should read -- comprises --. Column 4, line 73, "kow" should read -- flow --; line 75, "valve" should read -- value --. Column 5, line 3, "his" should read -- this --; line 4, "substanially" should read -- substantially --. Column 6, lines 49 and 50, cancel "the volatilized by the heat from the perishables, and". Column 8, line 2, "inlt" should read -- inlet --. Column 9, lines 40 and 41, "thereblow" should read -- therebelow --. Column 10, line 5, "Cavity" should read -- capacity --; line 75, "members" should read -- chambers --. Column 11, line 65, after "zone" insert -- section --.

Signed and sealed this 16th day of June 1970.

(SEAL)
Attest:

EDWARD M. FLETCHER, JR.                    WILLIAM E. SCHUYLER, JR.
Attesting Officer                            Commissioner of Patents